US008261490B2

(12) United States Patent
Flannery et al.

(10) Patent No.: US 8,261,490 B2
(45) Date of Patent: Sep. 11, 2012

(54) QUICKLY SLIDEABLE AND INCREMENTALLY ADJUSTABLE BARRIER

(75) Inventors: Mark A. Flannery, Longboat Key, FL (US); Lyle H. Rogalla, Hugo, MN (US)

(73) Assignee: Carlson Pet Products, Inc., Longboat Key, FL (US)

( * ) Notice: Subject to any disclaimer, the term of this patent is extended or adjusted under 35 U.S.C. 154(b) by 249 days.

(21) Appl. No.: 12/554,882

(22) Filed: Sep. 5, 2009

(65) Prior Publication Data

US 2010/0083577 A1    Apr. 8, 2010

Related U.S. Application Data

(60) Provisional application No. 61/191,383, filed on Sep. 6, 2008.

(51) Int. Cl.
*E06B 7/00* (2006.01)
(52) U.S. Cl. .................... 49/55; 49/57; 49/463; 49/465
(58) Field of Classification Search .............. 49/50, 55, 49/57, 463, 465; 248/188.5, 200.1
See application file for complete search history.

(56) References Cited

U.S. PATENT DOCUMENTS

| 3,216,482 | A | * | 11/1965 | Lindholm ................... 160/216 |
|---|---|---|---|---|
| 4,083,393 | A | | 4/1978 | Okada |
| 4,378,187 | A | | 3/1983 | Fullerton |
| 4,607,455 | A | | 8/1986 | Bluem et al. |
| 4,777,765 | A | | 10/1988 | Johnson, Jr. |
| 5,081,723 | A | * | 1/1992 | Saunders ........................ 5/100 |
| 5,139,381 | A | | 8/1992 | Lubreski et al. |
| 5,535,552 | A | | 7/1996 | Stern |
| 5,570,543 | A | * | 11/1996 | Bishop ............................ 49/465 |
| 5,657,809 | A | * | 8/1997 | Longoria et al. ............. 160/369 |
| 5,704,164 | A | * | 1/1998 | Huang ............................. 49/55 |
| 5,782,039 | A | * | 7/1998 | Scherer et al. ................. 49/465 |
| 5,797,218 | A | * | 8/1998 | Holland ........................... 49/55 |
| 6,016,629 | A | * | 1/2000 | Sylvester et al. ................ 49/55 |
| 6,112,460 | A | * | 9/2000 | Wagnitz ........................... 49/55 |
| 6,233,877 | B1 | * | 5/2001 | Monroe ........................... 52/37 |
| 2005/0042059 | A1 | | 2/2005 | Bremer |
| 2006/0107901 | A1 | * | 5/2006 | Hirokawa et al. ............. 119/452 |
| 2007/0144691 | A1 | * | 6/2007 | Yates ............................. 160/377 |

* cited by examiner

*Primary Examiner* — Katherine W Mitchell
*Assistant Examiner* — Marcus Menezes

(57) ABSTRACT

A barrier for the inside of a home. The barrier includes two partitions that slide relative to each other to increase and decrease a distance between ends of the barrier. The partitions slide into and out of confronting relationships with each other. The partitions engage each other at upper and lower locations and further at a medial location where an elongate member of one partition is received in a tube engaged to the other partition. A threaded piece upon being turned brings pressure to bear upon an end of the tube such that the partitions can be incrementally expanded apart and thereby pressurized between two locations within the home so as to block off one portion of the home. The threaded piece is slideable along the elongate member.

2 Claims, 8 Drawing Sheets

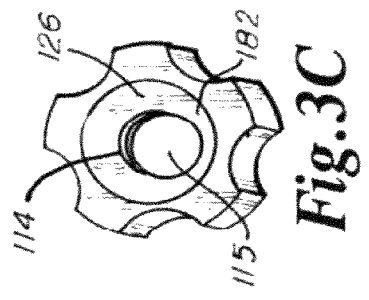
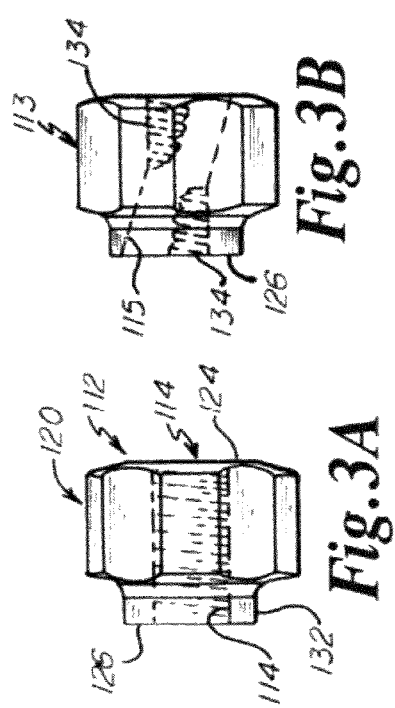
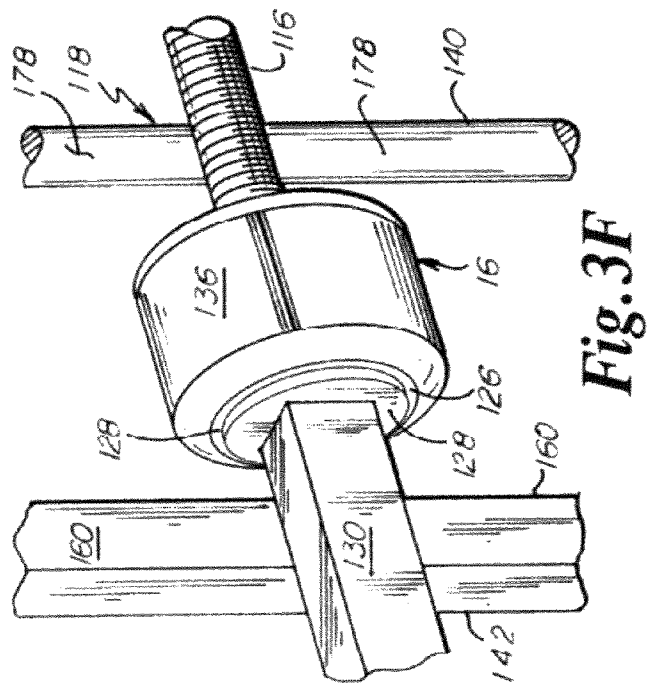
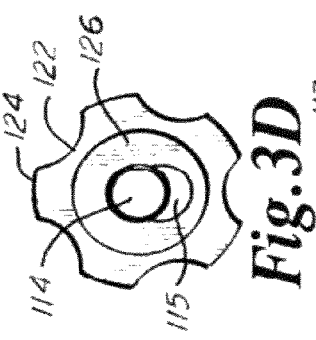
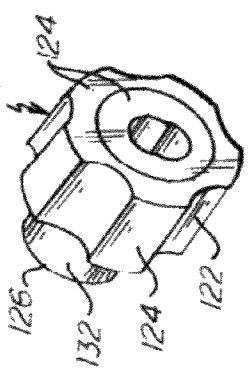

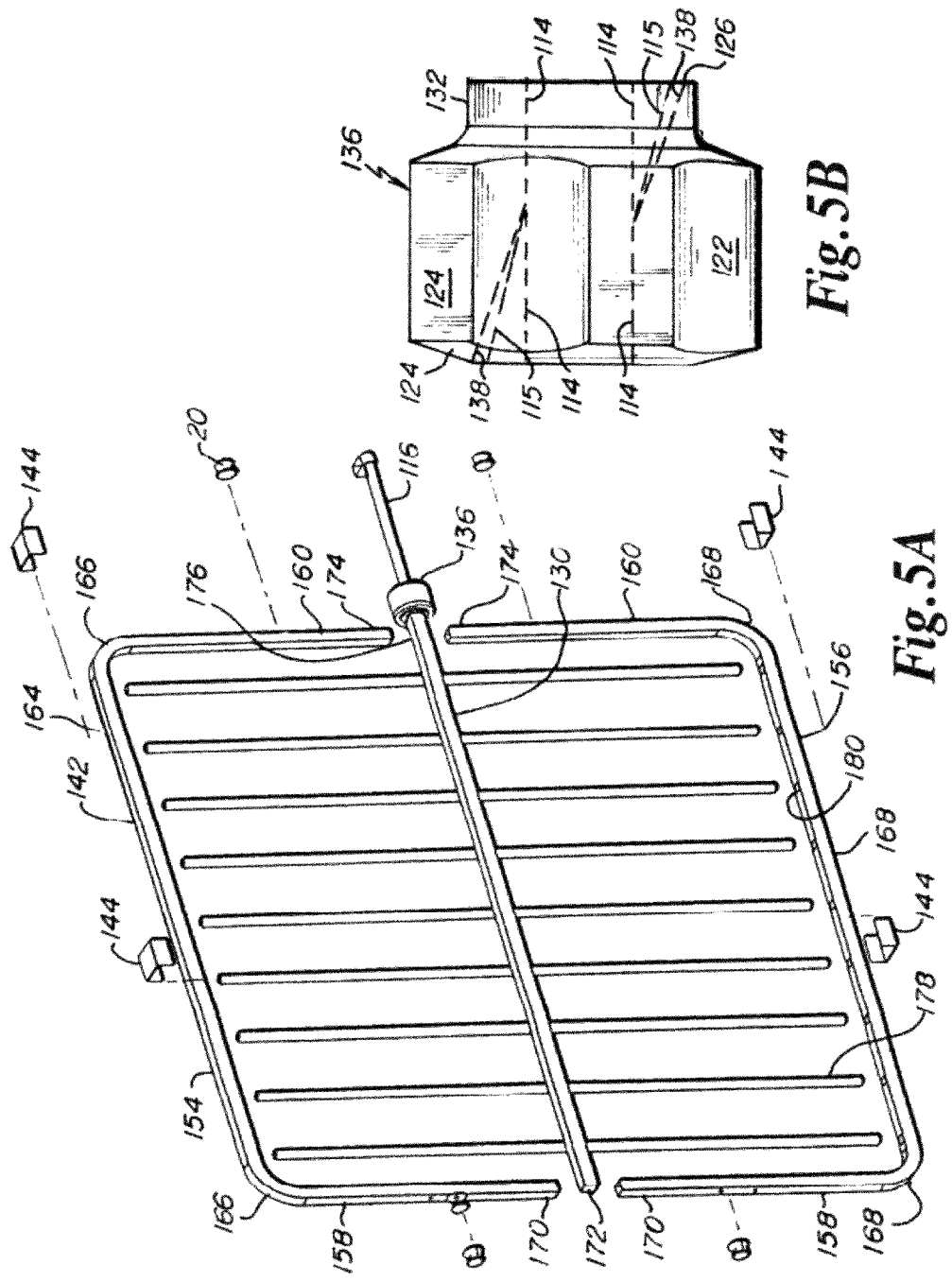

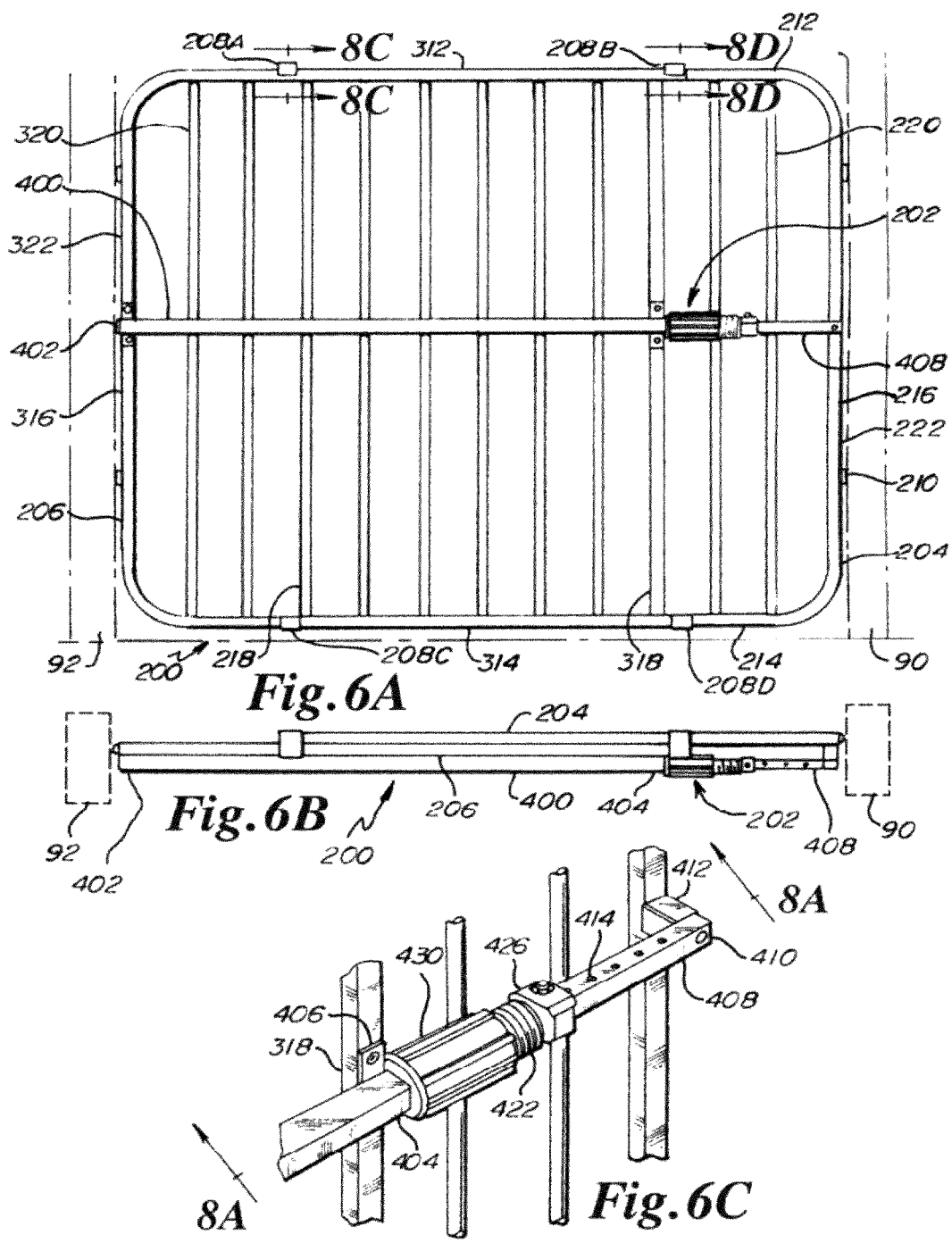

QUICKLY SLIDEABLE AND INCREMENTALLY ADJUSTABLE BARRIER

This application claims the benefit under 35 U.S.C. 119(e) of U.S. provisional application No. 61/191,383 filed Sep. 6, 2008, which provisional application is hereby incorporated by reference in its entirety into this application.

FIELD OF THE INVENTION

The present invention generally relates to a barrier for the inside of a home, more particularly to a barrier having two partitions slideable relative to each other, and more specifically where such two partitions can be incrementally pressurized between two locations.

BACKGROUND OF THE INVENTION

A gate or barrier for cordoning off an area of a house may include a mechanism for lengthening the gate, where length is defined as, for instance, the horizontal distance between the vertical jambs of a doorway. Such a mechanism may be meant to work quickly at the expense of working securely. For example, the mechanism may have a set of notches, each of which when engaged by a peg or pawl like device sets the length of the barrier at a certain predefined distance. This is problematic because some doorways are more narrow than other doorways. Therefore, utilization of one notch may engage the gate or barrier too loosely in a certain doorway, while utilization of the next notch in line may increase the effective length of the gate or barrier such that the gate or barrier is too long and may not fit in such a doorway at all. Or, if forced to fit in the doorway, the gate or barrier may bend and break or the mechanism may break. Moreover, gates or barriers for homes, especially those adjustable in length, are intended for engagement not only in doorways, but in many locations inside of the home, of which there are too numerous for these mechanisms having notches at predetermined positions.

SUMMARY OF THE INVENTION

A feature of the present invention is the provision in a sliding expanding incrementally adjustable barrier having two partition frames sliding parallel to each other in two parallel planes spaced apart from each other, of an upper guide between the two partition frames and of a lower guide between the two partition frames to maintain the two partition frames in said two planes and parallel to each other.

Another feature of the present invention is the provision in a sliding expanding incrementally adjustable barrier having two partition frames sliding parallel to each other in two parallel planes spaced apart from each other, of a threaded rod engaged to one of the partition frames, of a tube engaged to the other partition frame and the threaded rod being received in the tube, and of a piece having a threaded opening and being turnable on the threaded rod such that the piece can incrementally bring pressure to bear upon an end of the tube and thereby incrementally draw the partitions apart and incrementally expand an effective length of the barrier to pressurize the barrier between two locations such as between two jambs of a doorway.

Another feature of the present invention is the provision in a sliding expanding incrementally adjustable barrier having two partition frames sliding parallel to each other in two parallel planes spaced apart from each other, of the piece having the threaded opening being a slide nut such that the slide nut can be axially slid to a desired position quickly and then tightened at such desired position.

Another feature of the present invention is the provision in a sliding expanding incrementally adjustable barrier having two partition frames sliding parallel to each other in two parallel planes spaced apart from each other, of the piece with the threaded opening having first and second jaws hinged together where the jaws include first opposing ends and second opposing ends, where the first opposing ends form the threaded opening and are normally biased together, where the second opposing ends are normally biased apart, where the piece is quickly slideable in an axial direction on the threaded rod without engaging the threads on the rod when the second opposing ends are pinched toward each other to draw the first opposing ends apart, and where the first opposing ends and the piece as a whole are incrementally turnable upon the threaded rods when the second opposing ends are released.

Another feature of the present invention is the provision in a sliding expanding incrementally adjustable barrier having two partition frames sliding parallel to each other in two parallel planes spaced apart from each other, of the barrier including first and second lower guides, where one of the guides extends from one of the partition frames to the other partition frame, and where the other of the guides extends from the other partition frame to the first mentioned partition frame.

Another feature of the present invention is the provision in a sliding expanding incrementally adjustable barrier having two partition frames sliding parallel to each other in two parallel planes spaced apart from each other, of the barrier including first and second upper guides, where one of the guides extends from one of the partition frames to the other partition frame, and where the other of the guides extends from the other partition frame to the first mentioned partition frame.

Another feature of the present invention is the provision in a sliding expanding incrementally adjustable barrier having two partition frames sliding parallel to each other in two parallel planes spaced apart from each other, of the guides being cradles.

Another feature of the present invention is the provision in a sliding expanding incrementally adjustable barrier having two partitions sliding parallel to each other in two parallel planes spaced apart from each other, of the first and second partition frames including respective first and second faces, of the barrier including a fully closed configuration where the faces at least partially confront each other in the width direction, and of the barrier including a fully opened configuration where the faces are wholly offset from each other in the width direction.

Another feature of the present invention is the provision in a sliding expanding incrementally adjustable barrier having two partition frames sliding parallel to each other in two parallel planes spaced apart from each other, of the barrier including a fully closed configuration where the outer end member of the first partition frame confronts the inner end member of the second partition frame, and of the barrier including a fully opened position where the inner end member of the first partition frame confronts the inner end member of the second partition frame.

Another feature of the present invention is the provision in a sliding expanding incrementally adjustable barrier having two partition frames sliding parallel to each other in two parallel planes spaced apart from each other, of the barrier including a fully closed configuration where the end members are sequentially staggered in the following length direction: the outer end member of the first partition frame, then the inner end member of the second partition frame, then the inner end member of the first partition frame, then the outer end member of the second partition frame.

Another feature of the present invention is the provision in a sliding expanding incrementally adjustable barrier having two partition frames sliding parallel to each other in two parallel planes spaced apart from each other, of the barrier including a fully opened configuration where the end members are sequentially staggered in the following length direction: the outer end member of the first partition frame, then the inner end member of the first partition frame, then the inner end member of the second partition frame, and then the outer end member of the second partition frame.

Another feature of the present invention is the provision in a sliding expanding incrementally adjustable barrier having two partition frames sliding parallel to each other in two parallel planes spaced apart from each other, of the piece having the threaded opening being a slide nut such that the slide nut can be axially slid to a desired position quickly and then tightened at such desired position, where the slide nut includes a threaded through opening and a release bore, and where the release bore includes a frustoconical opening at each of its ends.

Another feature of the present invention is the provision in a sliding expanding incrementally adjustable barrier having two partition frames sliding parallel to each other in two parallel planes spaced apart from each other, of an elongate member extending from a first partition frame, of a tube extending from a second partition frame and receiving therein the elongate member, and of a slide slideable on the elongate member, where the slide includes a first portion fixable at one of a number of predefined spaced apart positions on the elongate member and where the slide includes a second threaded portion that incrementally brings pressure to bear against an end of the tube of the second partition such that the partitions are incrementally and slideably forced apart.

An advantage of the present invention is that it fits in relatively large doorways and relatively small doorways and, regardless of the size of the doorway, can be incrementally pressure fit to the large or small doorway. In other words, the present barrier is expandable from a relatively small length to a relatively great length and, regardless of how much the barrier has been expanded, the barrier can be incrementally expanded so as to become pressure fit securely between the two locations to which the barrier is engaged.

Another advantage of the present invention is that it is simple to use. There is but one mechanism to operate to expand the barrier in some embodiments and but two mechanisms to operate in other embodiments.

Another advantage of the present invention is that it may be operated quickly. One feature contributing to this advantage is the slide nut. Instead of turning a conventional nut along the entire length of the threaded rod, the slide nut can be quickly slid axially along the rod to the desired position and then tightened at the desired position. Another feature contributing to this advantage is the jawed piece that incrementally expands the two partitions relative to each other. The jawed piece, when pinched open, can easily and quickly slide axially on the threaded rod. When pinched open, the jawed piece does not engage the threads of the threaded rod and thus can travel at will back and forth on the threaded rod. When closed, and the jawed piece is normally biased closed, the jawed piece is turnable on the threaded rod, brings pressure to bear on the end of the tube receiving the threaded rod and thereby expands the partitions relative to each other. Another feature contributing to this advantage is the slide that can quickly be hand pushed to the desired location, whereupon a lift/drop button of the slide fixes the slide in place, whereupon a threaded member of the slide incrementally expands the partitions to a pressure fit against opposing members such as door jambs.

Another advantage of the present invention is that the present barrier is inexpensive to manufacture. For example, there are no complicated mechanisms to produce. Also, the manufacturing process for the first partition frame can be used for the second partition frame because the frames are identical to each other.

Another advantage of the present invention is that the present barrier can be expanded to about twice its shelf or fully closed size. In other words, the barrier can be sold in a box that takes up a minimum of shelf space and then, when taken out of the box, can be utilized at such a relatively small size or can be expanded to about twice its length to be utilized at such a relatively large size or can be utilized at any size therebetween.

BRIEF DESCRIPTION OF THE DRAWINGS

FIG. 3A is a side, partially phantom view of a nut having a relatively large knob, where the nut is a one-piece block nut, and which is a fourth mechanism for incrementally adjusting and incrementally pressurizing the barrier.

FIG. 3B is a side, partially phantom view of a slide nut having a relatively large knob, where the nut is a one-piece block nut, and which is a fifth mechanism for incrementally adjusting and incrementally pressurizing the barrier.

FIG. 3C is a slightly perspective view of the slide nut of FIG. 3B, where the releasing bore of the slide nut has an axis that is normal to the plane of the drawing of FIG. 3C and where the threaded bore of the slide nut has an axis that is normal to the general plane of the face of the slide nut.

FIG. 3D is an end view of the slide nut of FIG. 3B, where the releasing bore of the slide nut has an axis that is oblique to the plane of the drawing of FIG. 3D and where the threaded bore of the slide nut has an axis that is normal to the plane of the drawing of FIG. 3D.

FIG. 3E is a perspective view of the slide nut of FIG. 3B.

FIG. 3F is a perspective detail view of the slide nut of FIG. 3B on an article such as a barrier of the present invention and shows that the article preferably includes a flat or flat surface to engage an end of the slide nut of FIG. 3B.

FIG. 5A is a perspective, exploded view of one of the partitions of the barrier of FIG. 4.

FIG. 5B is a detail, side, partially phantom view of the slide nut of FIG. 3B.

FIG. 6A is a side view of an alternate embodiment of the barrier of the present invention.

FIG. 6B is a top view of the embodiment of the barrier of FIG. 6A.

FIG. 6C is a perspective, detail view of an incrementally adjustable slide of the embodiment of FIG. 6A.

DETAILED DESCRIPTION

Figure 1A:
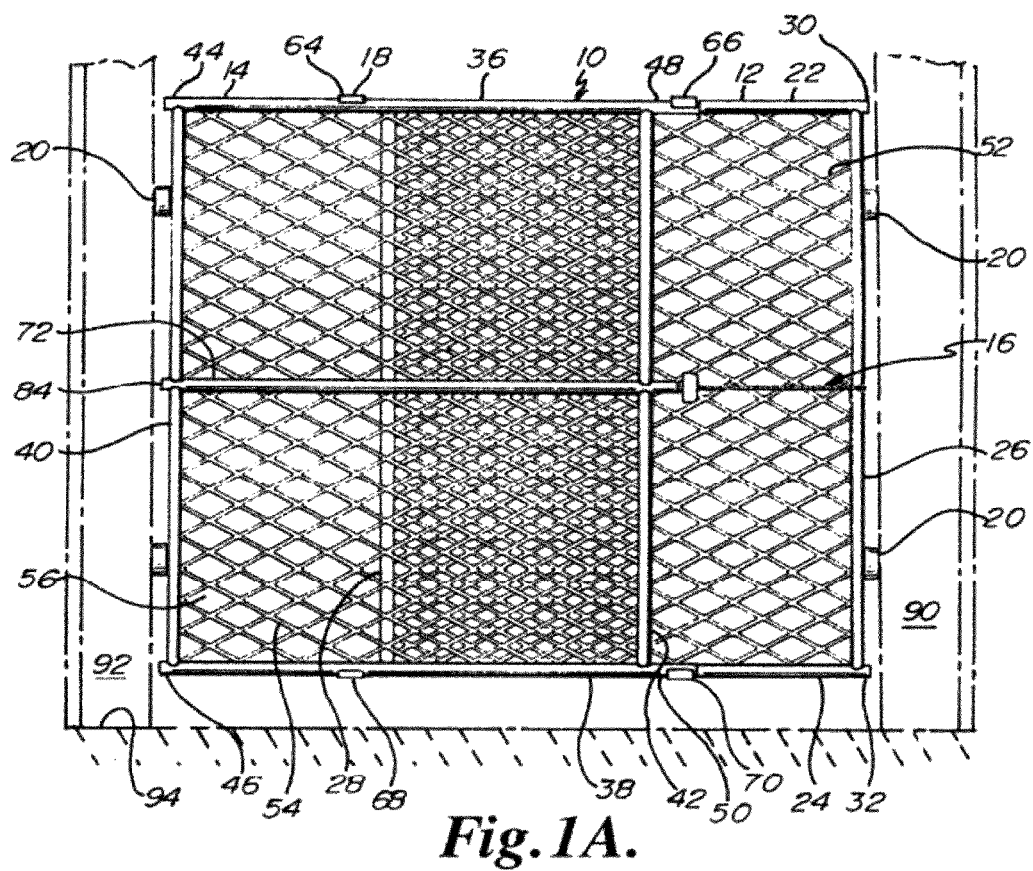
FIG. 1A is a side view of the present sliding expanding incrementally adjustable and incrementally pressurizable barrier showing the barrier engaged between two door jambs and slightly spaced from the floor and showing two partitions of the barrier overlapping each other.

As shown in FIG. 1, the present quickly slideable and incrementally adjustable barrier is indicated by reference numeral 10. The barrier 10 generally includes a first partition 12, a second partition 14, an adjusting and pressurizing mechanism 16, guides 18 running to and between the first and second partitions 12, 14, and bumpers 20 on an outer end of each of the partitions 12, 14.

Figure 2A:
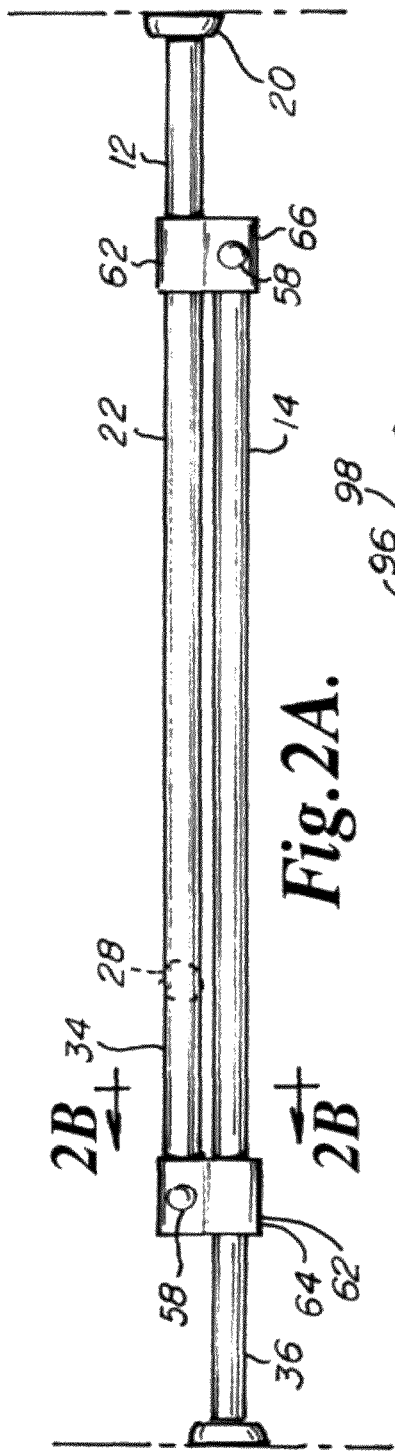
FIG. 2A is a top isolated view of the upper member of the first partition and the upper member of the second partition of the barrier of FIG. 1A and shows the two partitions being slideable relative to each other.

First partition 12 includes an upper member 22, a lower member 24, an outer end member 26, and an inner end member 28. Members 22, 24, 26 and 28 are preferably steel and tubular. Members 22, 24 run parallel to each other and preferably run horizontally when the barrier 10 is in use. Members 26, 28 run parallel to each other and preferably run vertically when the barrier 10 is in use. Members 22, 24 are preferably disposed at right angles to members 26, 28, and the junctions of such members 22, 24, 26, 28 are welded. End members 24, 26 run to and between upper and lower members 22, 24. Upper member 22 extends slightly beyond a junction of upper member 22 and outer end member 26 such that upper member 22 includes an upper and outer protruding end 30 that is capped by plastic cap. Lower member 24 extends slightly beyond a junction of lower member 24 and outer end member 26 such that lower member 24 includes a lower and outer protruding end 32 that is capped by a plastic cap. Upper member 22 extends slightly beyond a junction of upper member 22 and inner end member 28, as shown in FIG. 2A, such that upper member 22 includes an upper and inner protruding end 34 that is capped by a plastic cap. Lower member 24 extends slightly beyond a junction of lower member 24 and inner end member 28 such that lower member 24 includes a lower and inner protruding end that is capped by a plastic cap. The extent of the protrusion of such lower and inner protruding end beyond the junction of lower member 24 and inner end member 28 is indicated by the guide 18 that extends from such protruding end.

Second partition 14 includes an upper member 36, a lower member 38, an outer end member 40, and an inner end member 42. Members 36, 38, 40 and 42 are preferably steel and tubular. Members 36 and 38 run parallel to each other and preferably run horizontally when the barrier 10 is in use. Members 40 and 42 run parallel to each other and preferably run vertically when the barrier 10 is in use. Members 36 and 38 are preferably disposed at right angles to members 40 and 42 and the junctions of such members 36, 38, 40, 42 are welded. End members 40, 42 run to and between upper and lower members 36, 38. Upper member 36 extends slightly beyond a junction of upper member 36 and outer end member 40 such that upper member 36 includes an upper and outer protruding end 44 that is capped by plastic cap. Lower member 38 extends slightly beyond a junction of lower member 38 and outer end member 40 such that lower member 38 includes a lower and outer protruding end 46 that is capped by a plastic cap. Upper member 36 extends slightly beyond a junction of upper member 36 and inner end member 42, as shown in FIG. 1A, such that upper member 36 includes an upper and inner protruding end 48 that is capped by a plastic cap. Lower member 38 extends slightly beyond a junction of lower member 38 and inner end member 42 such that lower member 38 includes a lower and inner protruding end 50 that is capped by a plastic cap.

A direction between the outer and inner end members of the respective partitions 12, 14 is a length direction. A direction between the upper and lower members of the respective partitions 12, 14 is a height direction. A direction between the partitions 12, 14 is a width direction and the partitions 12, 14 are spaced apart in the width direction. The upper and lower members of the partitions 12, 14 extend in the length direction. The outer and inner end members of the partitions 12, 14 extend in the height direction.

Each of the first and second partitions 12, 14 includes a relatively rigid screen or network 52, 54, respectively. Each of the rigid screens 52, 54 includes a plurality of diamond-shaped openings 56, where each diamond-shaped opening 56 is about two inches in length from point to point and about one inch in height from point to point. The rigidity of the screens 52, 54 is relatively high such that the screens 52, 54 may also be referred to as punched-plate screens such that the screens 52, 54 have the rigidity of a flat plate from which diamond-shaped openings have been punched. Diamond-shaped openings 52, 54 are preferably sufficiently large to permit fingers to extend therethrough. Diamond-shaped openings 52, 54 are preferably sufficiently small to prevent hands, such as the hands of a child, from extending therethrough. Screen 52 is welded to members 22, 24, 26 and 28. Screen 54 is welded to members 36, 38, 40 and 42.

Figure 2B:
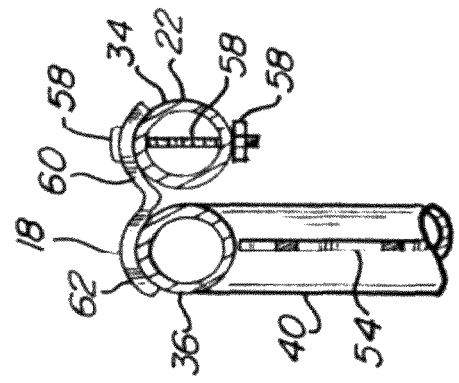
FIG. 2B is a section at lines 2B-2B of FIG. 2A.

Guides 18 extend to and between the first and second partitions 12, 14. As shown in FIG. 2B, guide 18 is fixed by a pin connector 58, such as a rivet, that extends completely through one of the upper or lower members, with the upper member 22 and its upper and inner protruding end 34 being shown in FIG. 2B. Guide 18 is formed in the shape of two cradle portions 60, 62. Cradle portion 60 is affixed to upper member 22 via the pin connector 58. Cradle portion 62 engages the upper member 36 of the second partition 14 and permits the upper member 36 to slide therein.

For clarity, each of the guides 18 is given a unique respective reference number 64, 66, 68, 70. Upper guides 64, 66 engage the upper members 22, 36. Lower guides 68, 70 engage the lower members 24, 38. As indicated in FIG. 2A, upper member 22 of the first partition 12 is affixed to upper guide 64 and upper member 36 of the second partition 14 slides in upper guide 64, while upper member 22 of the first partition 12 slides in upper guide 66 and upper member 36 of the second partition 14 is affixed to upper guide 66. Lower guides 68 and 70 are likewise employed. That is, lower member 24 of the first partition 12 is affixed to lower guide 68 and lower member 38 of the second partition 14 slides in lower guide 68, while lower member 24 of the first partition 12 slides in lower guide 70 and lower member 38 of the second partition 14 is affixed to lower guide 70. It should be noted that upper guide 64 is aligned vertically with lower guide 68 and that upper guide 66 is aligned vertically with lower guide 70. Each of the guides 64, 66, 68 and 70 include the cradle portions 60, 62.

Guides 64, 66, 68 and 70 space the first and second partitions 12 and 14 apart from each other. Via the guides 64, 66, 68 and 70, the frames of the partitions 12 and 14 are mounted in spaced apart parallel planes and slide in such parallel planes.

Figure 1B:
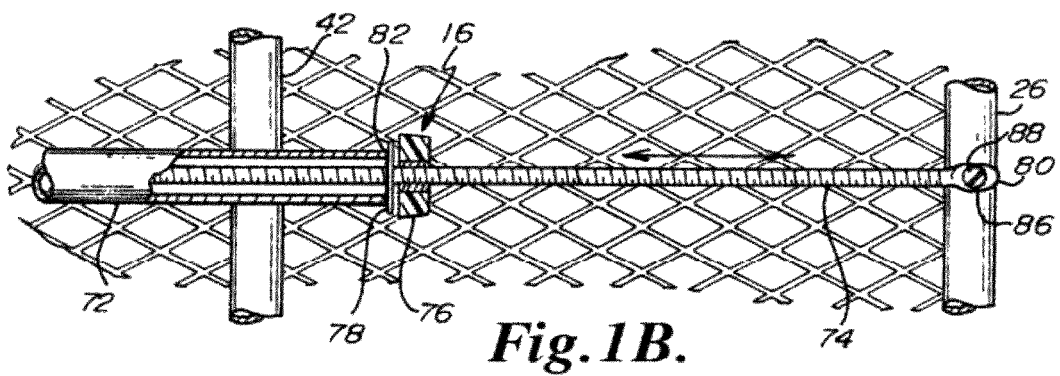
FIG. 1B is a detail side view of a portion of the barrier of FIG. 1A, and shows a first mechanism for incrementally adjusting the length of the barrier and for incrementally pressurizing the barrier between two locations such as two door jambs, where the first mechanism includes a slide nut.

As shown in FIG. 1B, the adjusting and pressurizing mechanism 16 includes a medial tube or receiver 72, a threaded rod 74 running into the tube 72, a winged slide nut 76, a washer 78, and spacer 80. Medial tube 72 is engaged, such as by welding, to the outer and inner end members 40, 42 of the second partition 14 at an equidistance from upper and lower members 36, 38 of second partition 14. Medial tube 72 extends in the length direction. Medial tube 72 is offset from the plane in which second partition 14 lies. Medial tube 72 is spaced from the rigid screen 54 of the second partition 14. Medial tube 72 includes a proximal end 82 that is open and a distal end 84 that is capped such as with a plastic cap. Threaded rod 74 includes a proximal end 86 that is fixed to outer end member 26 of the first partition 12 by a pin connector 88 that extends through spacer 80. Spacer 80, by supporting the proximal end 86, spaces the proximal end 86 from the outer end member 26 and the first partition 12 to keep the threaded rod 74 coaxial with the medial tube 72. Spacer 80, threaded rod 74, and medial tube 72 work with guides 64, 66, 68, and 70 to maintain the first and second partitions 12, 14 in their respective spaced apart parallel planes. Winged slide nut 76 threadingly, at certain times, and slidingly, at other times, engages threaded rod 72 and brings pressure to bear upon fixed end 82 of fixed medial tube 72, via washer 78 on the threaded rod 72, to incrementally slide the outer end member 40 of the second partition 14 away from and in the opposite direction of the outer end member 26 of the first partition 12. This incremental sliding brings, on an incremental basis, pressure to bear on two vertical door jambs 90, 92 such that the barrier 10 may be engaged between the door jambs 90, 92 and spaced from a floor 94. Such incremental pressure also internally pressurizes the barrier 10 by pressurizing first partition 12 against second partition 14. To disengage the barrier 10 from the door jambs 90, 92, the winged slide nut 76 is turned so as to loosen the winged slide nut 76 and permit the outer end member 40 of the second partition to slide back toward the outer end member 26 of first partition 12.

Winged slide nut 76 is a slide fit nut or a jam nut. Slide fit nuts and jam nuts can be segmented nuts that can be rapidly pushed on to threaded bolts quickly and easily with a simple push-on action in the axial direction and can be rapidly removed from bolts, after loosening with several rotations, with a simple pull-off action in the axial direction. In other words, the slide fit nuts and jam nuts are nuts that can be inserted from the tip of the bolt by simply pressing it axially all the way to a determined fastening position without turning or spinning the nut. In removing the slide fit or jam nut from the bolt, the slide fit or jam nut may be turned several times or for several rotations and then simply be pulled out axially without the need for turning it all of the way. The slide nut 76 can be slid axially along threaded rod 74 until pressure is brought to bear on the washer 78 and end 82 of the tube 72, whereupon the slide nut 76 can be turned in the tightening direction, whereupon the slide nut 76 engages the thread of the threaded rod 74 and incrementally pressurizes the barrier 10. To loosen the fastened slide nut 76, the slide nut 76 is turned several times in the loosening direction, whereupon the slide nut 76 disengages the thread of the threaded rod 74, and whereupon the slide nut may be slid back axially in the direction of spacer 80. As to slide fit nuts or jam nuts the following U.S. patents are hereby incorporated by reference in their entireties: 1) the Okada U.S. Pat. No. 4,083,393 issued Apr. 11, 1978 and entitled Nut; 2) the Fullerton U.S. Pat. No. 4,378,187 issued Mar. 29, 1983 and entitled Quick-Acting Nut Assembly; and 3) the Lubreski et al. U.S. Pat. No. 5,139,381 issued Aug. 18, 1992 and entitled Slide-Fit Nut.

First partition 12 includes upper and lower bumpers 20 engaged with outer end member 26 via pin connectors. Second partition 14 includes upper and lower bumpers 20 engaged with outer end member 40 via pin connectors. Bumper 20 is resilient so as to internally absorb some of the pressure exerted by the mechanism 16. Bumper 20 may include elastomeric or rubber or rubber like material or be wholly formed from elastomeric or rubber or rubber like material. Bumper 20 is of a sufficient length so as to extend further in the length direction than any of the protruding outer ends 30, 32, 44, 46. Bumper 20 includes a recess formed axially therein for receiving the head of the pin connector that mounts the bumper 20 to the outer end member 26 or 40 such that the bumper 20, and not the pin connector, makes contact with the door jambs 90, 92.

In operation, barrier 10 can be removed from a shipping box or container. In this state, barrier 10 is in a fully closed configuration. In this fully closed configuration, winged slide nut 76 confronts the proximal end 86 of the threaded rod 74 and the outer end member 26 of the first partition 12 confronts the inner end member 42 of the second partition 14. Also, in this fully closed configuration, outer end member 40 of second partition 14 confronts the inner end member 28 of the first partition 12. In this fully closed configuration, the end members are sequentially lined up or staggered as follows: outer end member 26 of the first partition 12, inner end member 42 of the second partition 14, inner end member 28 of the first partition 12, and outer end member 40 of the second partition 14. This fully closed configuration is found with barriers 118 and 200 as well.

Then, if desired, barrier 10 can be converted to a fully open position by hand sliding and thus quickly sliding the outer end member 40 of the second partition 14 away from the outer end member 26 of the first partition 12. In the fully open position, the inner edges of guides 64 and 68 confront the inner edges of guides 66 and 70 such that the guides 64, 66, 68 and 70 act as stops to prevent the disengagement of the partitions 12, 14 from each other. To utilize the barrier 10 in the fully open position, the winged slide nut 76 is utilized to expand the barrier 10 from a configuration just short of the fully open position to the fully open position such that the barrier 10 is pressurized in the fully open position. In the fully open position, inner end member 42 of the second partition 14 confronts the inner end member 28 of the first partition 12. In this fully open configuration, the end members are sequentially lined up or staggered as follows: outer end member 26 of the first partition 12, inner end member 28 of the first partition 12, inner end member 42 of the second partition 14, and outer end member 40 of the second partition 14. This fully open configuration is found in barriers 118 and 200 as well.

The barrier 10 can be utilized in any in-between configuration, that is, any configuration between the fully closed configuration and the fully open configuration. In moving to an in-between position, the partitions 12 and 14 can be hand slid relative to each other. If the winged slide nut 76 stops such relative sliding, then the winged slide nut 76 is spun to be loosened and then or pushed axially toward the proximal end 86 of the threaded rod 74 to permit further contraction of the barrier 10. It should be noted that, unless engaged between two locations such as the door jambs 90, 92, the partitions 12, 14 can always be expanded relative to each other because for expansion the only stops are the guides 64, 68 making contact with the guides 66, 70. It should be noted that the two partitions 12, 14 can always be contracted relative to each other if the winged slide nut 76 has been loosened, and the partitions 12, 14 can then be contracted up to where the winged slide nut 76 engages the spacer 80, because the winged slide nut 76 when loosened slides axially on the threaded rod 74. In other words, contraction of the barrier 10 when the winged slide nut 76 is loosened is no different from expansion such that partitions 12, 14 can always be contracted relative to each other because the only stop for contraction is the spacer 80 on the proximal end 86 of the threaded rod 74. An ultimate end position for the winged slide nut 76 is where the winged slide nut 76 confronts the spacer 80 and here, where the open end 82 of the tube 72 confronts the winged slide nut 76, there is no further contraction between the first and second partitions 12, 14.

In the fully closed configuration, and in some of the in-between positions, the rigid screens 52, 54 overlap or confront each other in the transverse or width direction. In the fully open configuration and in some of the in-between configurations, the rigid screens 52, 54 are wholly offset from each other in the width direction such that no portion of the face of screen 52 confronts no portion of the face of screen 54.

When initially setting up barrier 10 between two locations such as the door jambs 90, 92, the partitions 12, 14 can be hand slid apart until the bumpers 20 of the end members 40 and 26 make contact with the door jambs 90, 92. Then the winged slide nut 76 is slid axially along the threaded rod 74 and then turned and tightened somewhat to bring pressure to bear on the washer 78, which in turn brings pressure to bear on the open end 82 of the tube 72, which in turn expands the barrier 10 incrementally. At such a point, the barrier 10 can be slid vertically up the door jambs 90, 92 to a desired height. Then the winged slide nut 76 can be tightened even more until the desired pressure is reached. It should be noted that the middle step here can be eliminated because the tightening of the winged slide nut 76 is a one hand operation. In other words, the partitions 12, 14 can be slid apart to an approximate distance of the distance between the door jambs 90, 92, then one hand can pick up the barrier 10 and place the barrier 10 at the desired height and, while this one hand is holding the barrier 10 at the desired height, the other hand can tighten the winged slide nut 76. To remove the barrier 10 from two locations such as from the door jambs 90, 92, the process is reversed, with the winged slide nut 76 being loosened slightly at first and then permitting the barrier 10 to rest on the floor 94, or with the winged slide nut 76 being loosened to a greater degree where one hand is holding the barrier 10 to prevent the barrier 10 from falling and where the other hand loosens the winged slide nut 76.

Figure 2C:
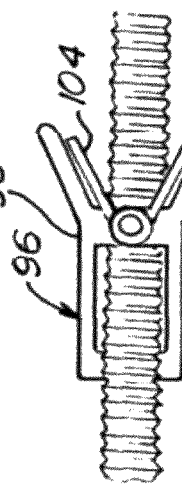
FIG. 2C is a side view of a second mechanism for incrementally adjusting the length of the barrier and for incrementally pressurizing the barrier between two locations such as two door jambs, where the second mechanism includes a jawed nut, and shows the jaws of the jawed nut engaging a threaded rod.
Figure 2D:
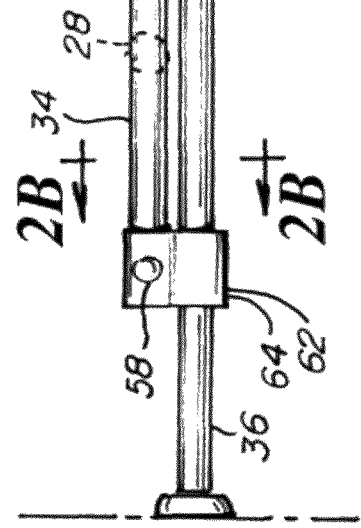
FIG. 2D is a side view of the second mechanism of FIG. 2C and shows the jaws of the jawed nut disengaged with the threaded rod such that the jawed nut can slide quickly in the axial direction along the threaded rod.

As indicated above, winged slide nut 76 is preferably a segmented nut, slide nut, slide fit nut, or jam nut. FIGS. 2C and 2D show another type of slide nut or slide fit nut where a jawed nut 96 includes a pair of jaws 98 and 100 that are hinged together via a pair of pin connectors 102. Flat springs 104 are biased so as to normally urge finger portions or opposing ends 106 of the jaws 98, 100 apart from each other and so as to normally urge threaded end portions or opposing ends 108 of jaws 98, 100 toward each other and into engagement with threaded rod 74. Upon squeezing or pinching the finger portions 106 together, threaded end portions 108 are drawn apart, thereby permitting jawed nut 96 to slide axially and quickly along the threaded rod 74. Then, when end portions 108 make contact with washer 78, the finger portions 106 can be released, whereupon the finger portions 106 can be manipulated without squeezing to turn or rotate or spin the jawed nut 96 with the threads of the threaded rod 74 to bring pressure upon the open end 82 of the tube 72 to incrementally slide the partitions 12, 14 apart and to incrementally bring pressure to bear upon the door jambs 90, 92 and to internally pressurize the barrier 10. To release the pressure, the jawed nut 96 is spun backwards until the pressure is safely released, whereupon the finger portions 106 can be squeezed to quickly draw the jawed nut 96 axially along the threaded rod 74.

Figure 2E:
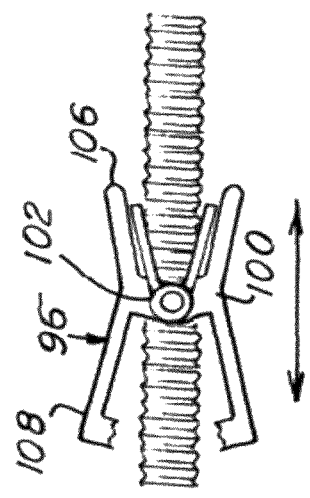
FIG. 2E is a perspective view of a wing nut, where the wing nut is a one-piece block nut, for a third mechanism for incrementally adjusting and incrementally pressurizing the barrier.

FIG. 2E shows a conventional wing nut 110, which, if desired, may be used as an alternative to the winged slide nut 76. Wing nut 110 is in a block form. Wing nut 110 is formed from one piece, not segmented or formed from multiple pieces like slide nuts are. With wing nut 110, which does not slide axially along threaded rod 74 but instead must be spun or turned along the entire length of threaded rod 74, it should be noted that contraction of the barrier 10 is halted when the open end 82 of tube 72 hits the washer 78 which in turn hits the wing nut 110. In this manner, wing nut 110 acts as a stop to such contraction wherever the wing nut 110 is located on the threaded rod 74. It should be noted that, if desired, slide nut 76 can as well act as a stop by turning slide nut 76 in the tightening direction, whereupon slide nut 76 engages the thread of the threaded rod 74.

FIG. 3A shows a nut 112 having a threaded through opening 114 for engagement of threaded rod 74 or the threaded rod 116 of barrier 118. Nut 112 may be used as it is, without a release bore. Or nut 112 may be converted, as described below, into a slide nut 113 shown in FIGS. 3B, 3C, 3C, 3D and 3E by drilling a release bore 115 at an angle to the axis of the threaded through opening 114.

Each of nuts 112 and 113 includes a relatively large knob portion 120. The outer perimeter surface of the knob portion 120 is knurled or includes cylindrical cut out portions 122, alternating with ridges 124. Portions 122 and ridges 124 run in the direction of the axis of the threaded through opening 114.

Each of nuts 112 and 113 includes a pair of end faces 124, 126. End face 124 is undulating and lies generally in a plane. End face 126 is flat, and is preferably flat and lies in a plane. End face 126 confronts and brings pressure to bear upon a flat 128 or flat portion 128. Flat 128 or flat portion 128 is integral or welded to or one-piece with barrier 118. More specifically, flat 128 or flat portion 128 is integral or welded to or one-piece with medial tube 130 of one partition of barrier 118. End face 124 and end face 126 are generally parallel to each other and normal to the axis of threaded through opening 114. End face 124 is formed on the knob portion 120 of nuts 112, 113. End face 126 is disposed on a generally cylindrical extension 132 extending co-axially from knob portion 120.

Nuts 112, 113 can be formed by injection molding. Nuts 112, 113 may be wholly plastic. Nuts 112, 113 may be plastic and include an aluminum insert where the aluminum insert includes the threaded through opening 114 and the release bore 115. Nuts 112, 113 may be formed of a nylon.

After being injection molded or formed in another manner, a first step of forming threaded opening 114 of nut 112 can be to tap drill a through opening with no threads. A second step can be to perform a full through tap that makes the threads. At this point, nut 112 can be used as is. That is nut 112 can be used with threaded opening 114, with no release bore 115, and with no cone shaped ends 138.

Nut 112 is advantageously used over winged nut 110. Nut 112 includes a relatively large knob portion 120 that is easy to turn. Nut 112 has a larger mass and thus can be turned more quickly and continue spinning over greater distances on its own, i.e., under inertia, when a direct hand spinning force has been removed.

While nut 112 can be used as is, nut 112 can also be converted into slide nut 113. After the second step of making the threads, the axis of nut 112 can be tipped, such as at 12 degrees, whereupon a plunging end mill operation can be performed, without making threads, to form the release bore 115 having a smooth cylindrical inner face within slide nut 113. When slide nut 113 is sliding on threaded rod 74 or 116, the smooth cylindrical inner face of the release bore 115 confronts and rides on the ridges or threads of the threaded rod 74 or 116 such that the slide nut 113 can slide quickly over short or long distances along the threaded rod 74 or 116. The diameter of the release bore 115 is preferably at or slightly greater than the diameter of the threaded rod 74 or 116 where the diameter of the threaded rod 74 or 116 is measured by the outer surface of the ridges or threads of the threaded rod 74 or 116. The angle that the axis of nut 112 is tipped for the performance of the plunging end mill operation (or the angle between the threaded opening 114 and release bore 115) can be an angle between about 8 and about 16 degrees, more preferably between about 10 and about 14 degrees, still more preferably between about 11 and about 13 degrees, and most preferably about 12 degrees.

The axis of the threaded through opening 114 intersects the axis of the release bore 115 at one point. The inner space defined by threaded opening 114 intersects the inner space defined by release bore 115 over a range. The axis of the threaded through opening 114 and the axis of the release bore 115 are co-planar. The plunging mill operation for the release bore 115 destroys a portion of the threads of the threaded opening 114 and leaves in place a portion of the threads of the threaded opening 114. The threaded portions that remain are indicated by reference numerals 134 in FIG. 3B. One threaded portion 134 confronts end face 124. The other threaded portion 134 confronts end face 126. The threaded portions 134 are generally diametrically opposite of each other, although one portion 134 confronts one end of the nut 113 and the other portion 134 confronts the other end of the nut 113. Threaded opening 114 exits each of the faces 124, 126. Release bore 115 exits each of the faces 124, 126. The axis of the release bore 115 is oblique relative to the axis of the nut 113 as a whole. The axis of the threaded through opening 114 is coaxial with the axis of the nut 113 as a whole.

As indicated above, the diameter of the release bore 115 is greater than the diameter of the threaded rod 74 or threaded rod 116 where the diameter of the threaded rod 74 or 116 is measured by the outermost surface of the threads on the rod 74 or 116 such that the slide nut 113 can slide along the rod 74 or 116 without engaging the threads of the rod 74, 116. In other words, the diameter of the release bore 115 is sufficiently great such that, when the rod 74 or 116 is turned so as to be vertical, slide nut 113 can drop by gravity to the lowermost portion of the rod 74, 116.

When the end face 126 of slide nut 113 engages flat 128, end face 126 may be oblique relative to flat 128. As the slide nut 113 is pushed or slid closer to flat 128 such end face 126 makes contact with flat 128, end face 126 and flat 128 will begin to draw parallel to each other. As the end face 126 and flat 128 begin to draw parallel to each other, the axis of the threaded through opening 114 will begin to draw closer and closer to a parallel and coaxial relationship with threaded rod 74 or 116 whereupon the threads of the rod 74 or 116 will engage the threads of the threaded opening 114, whereupon the nut 113 can be tightened against the flat 128.

FIG. 5B shows another slide nut 136. Slide nut 136 is identical to slide nut 113, except that the release bore 115 can be widened at the outer ends of bore 115. This widened opening is illustrated by reference number 138. This widened opening 138 is formed by oscillating the bit or plunging tool that forms release bore 115. In other words, when release bore 115 is formed, the bit or other tool that forms bore 115 maintains travel along one axis, and this axis becomes the axis of the release bore 115. However, by oscillating or by skewing the drill bit or tool off the release bore axis or by moving the drill bit in a cone shaped pattern, a cone shape or frustoconical cone shape is formed at each of the openings of release bore 115, i.e., at the opening on end face 124 and at the opening on end face 126. This partial or frustoconical cone configuration includes its widest portion at the ends, i.e., end face 124 or 126. This partial or frustoconical cone configuration includes its narrowest portion disposed medially of the two ends, i.e., between the end faces 124, 126. In other words, slide nut 136 includes a release bore 115 that includes a frustoconical shaped bore end 138 confronting end face 124 and a frustoconical shaped bore end 138 confronting end face 126. With the cone shaped openings or ends 138, slide nut 138 slides relatively more easily than slide nut 113.

By forming frustoconical shaped openings 138, threads of the threaded opening 114 are preserved for a tighter engagement with flat 128 and, at the same time, nut 136 slides more easily. In contrast, to obtain a nut 113 that slides as easily under gravity as nut 136, nut 113 would require a release bore 115 of greater diameter, in which case a greater number of threads are destroyed, leading to a looser engagement with flat 128.

It should be noted that an important feature of the adjusting and pressurizing mechanism 16 is the slide nut 113 or 136 itself. Another important feature of the adjusting and pressurizing mechanism 16 is the flat 128. It should be noted here that one feature here is on partition 140. The other feature is on partition 142. Slide nut 113 includes a threaded opening 114 and a release bore 115. Slide nut 136 includes a threaded opening 114, release bore 115, and frustoconical openings 138. Each of nuts 113 and 136 includes an end face 126 having a continuous smooth circular band 182, as shown in FIG. 3C, running immediately beyond release bore 115 and running about each of release bore 115 and threaded opening 114. One band 182 contains both bore 115 and opening 114. It is preferred that the diameter of flat 128 be at least as great as the outer diameter of band 182. The diameter of the flat 128 or flat disk 128 is limited by the thickness of partition 142 and cannot be so great so as to prevent relative sliding of the partitions 140, 142. It should be noted that the outer face of flat 128 is flat and smooth, and this outer face is the portion of flat 128 that makes contact with band 182. Flat 128 is a disk.

It should be noted that the outer diameter of band 182 can be less than the diameter of end face 126 such that the diameter of flat 128 can be less than the diameter of end face 126. However, it is preferred that the diameter of flat 128 is generally the same as the diameter of end face 126.

Figure 4:
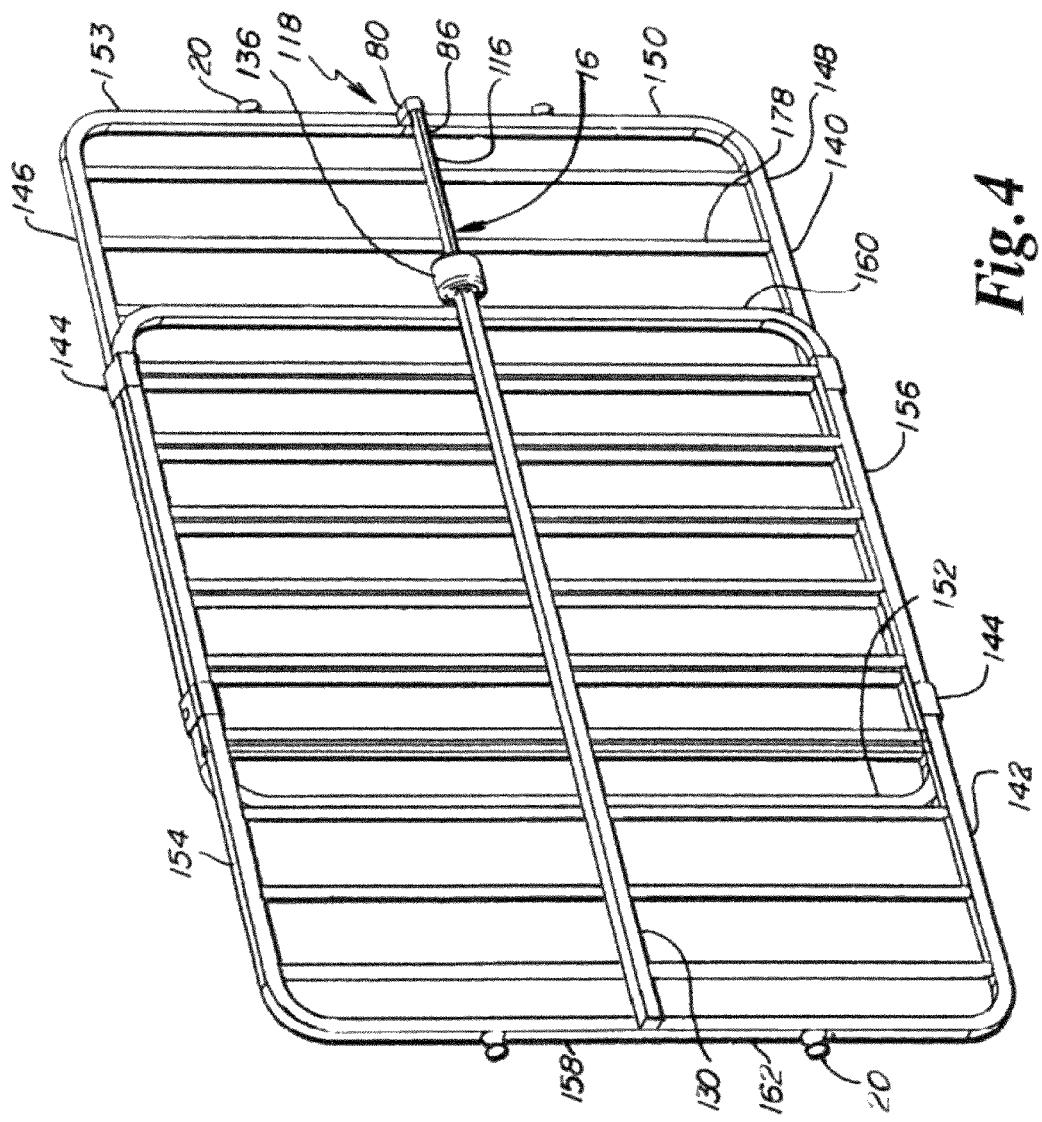
FIG. 4 is perspective view of an alternate embodiment of the barrier of the present invention.

As shown in FIG. 4, an alternate embodiment of the present quickly slideable and incrementally adjustable barrier is indicated by reference numeral 118. The barrier 118 generally includes a first partition 140, a second partition 142, an adjusting and pressurizing mechanism 16, guides 144 running to and between the first and second partitions 140, 142 and bumpers 20 on an outer end of each of the partitions 140, 142.

As shown in FIG. 4, first partition 140 includes an upper member 146, a lower member 148, an outer end member 150, and an inner end member 152. Members 146, 148, 150 and 152 are preferably steel and tubular. Members 146, 148 run parallel to each other and preferably run horizontally when the barrier 118 is in use. Members 150, 152 run parallel to each other and preferably run vertically when the barrier 118 is in use. Members 146, 148 are preferably disposed at right angles to members 150, 152 and the junctions of such members 146, 148, 150, 152 are curved. End members 150, 152 run to and between upper and lower members 146, 148. Members 146, 148, 150, 152 make up a peripheral frame 153 for partition 142.

Second partition 142 includes an upper member 154, a lower member 156, an outer end member 158, and an inner end member 160. Members 154, 156, 158, 160 are preferably steel and tubular. Members 154, 156 run parallel to each other and preferably run horizontally when the barrier 118 is in use. Members 158, 160 run parallel to each other and preferably run vertically when the barrier 118 is in use. Members 154, 156 are preferably disposed at right angles to members 158, 160 and the junctions of such members 154, 156, 158, 160 are curved. End members 158, 160 run to and between upper and lower members 154, 156. Members 154, 156, 158, 160 make up a peripheral frame 162 for partition 142.

A direction between the outer and inner end members of the respective partitions 140, 142 is a length direction. A direction between the upper and lower members of the respective partitions 140, 142 is a height direction. A direction between the partitions 140, 142 themselves is a width direction and the partitions 140, 142 are spaced apart in the width direction. The upper and lower members of the partitions 140, 142 extend in the length direction. The outer and inner end members of the partitions 140, 142 extend in the height direction.

FIG. 5A shows a preferred way to make peripheral frame 162 (or peripheral frame 153). Here a top tube piece 164 integrally contains one-half of outer end member 158 and one-half of inner end member 160. This top tube piece 164 having one-half of each of the members 158, 160 is originally straight. Then top tube piece 164 is bent at junctures 166 to form one-half of member 158 and one-half of member 160. Also, a bottom tube piece 168 integrally contains one-half of outer end member 158 and one-half of inner end member 160. This bottom tube piece 168 having one-half of each of the members 158, 160 is originally straight. Then bottom tube piece 168 is bent at junctures 168 to form one-half of member 158 and one-half of member 160. Then the outer ends 170 of tube pieces 164, 168 are welded to end 172 of medial tube 130, and inner ends 174 of tube pieces 164, 168 are welded to inner end portion 176 of medial tube 130 so as to form the peripheral frame 162. Peripheral frame 153 is made the same way except that peripheral frame 153 and partition 140 includes, instead of medial tube 130, a threaded rod 116 mounted via a spacer 80 welded at the ends 174 of frame 153.

Figure 7A:
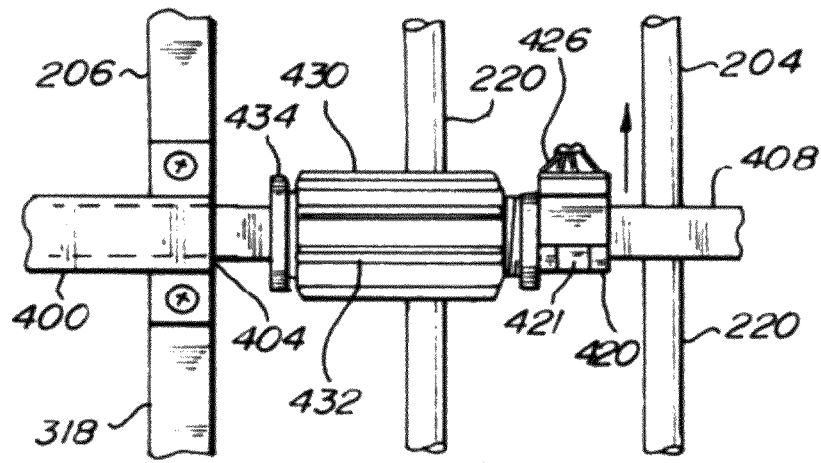
FIG. 7A is a side, detail view of the incrementally adjustable slide of FIG. 6B prior to being slid from a first predefined position to a second predefined position.
Figure 7B:
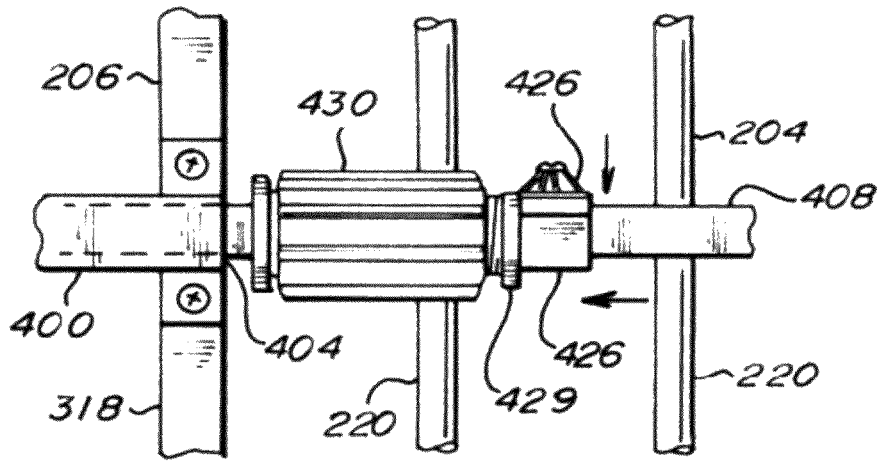
FIG. 7B is a side, detail view of the incrementally adjustable slide of FIG. 7A after being slid from a first predefined position to a second predefined position and prior to the incrementally adjustable slide having been operated.

Prior to ends 170 being joined such as by welding and prior to ends 174 being joined such as by welding, each of the partitions 140, 142 is provided with a set of vertical tubes or rods 178 that are engaged in openings 180. Each of upper members 146 and 154 includes a set of openings 180 where the openings 180 are formed in a lower face of members 146, 154. Each of lower members 148, 156 includes a set of openings 180 where the openings 180 are formed in an upper face of members 148, 156. Openings 180 are precision formed such as by laser cutting such that no welding is needed when the tubes 178 are set in the openings 180. After the tubes 178 are set in the openings 180, ends 170, 172 are joined and ends 174 are joined to portion 176 to form partition 142. Partition 140 is formed in a like manner except that spacer 80 is joined to ends 174. After the partitions 140, 142 are formed, slide nut 113 or slide nut 136 is inserted onto the distal free end of threaded rod 116, and then the distal free end of threaded rod 116 is inserted into medial tube 130. Then guides 144 are set in place so as to form barrier 118. Barrier 118 preferably includes slide nut 113 of FIGS. 3B, 3C, 3D and 3E or slide nut 136 of FIG. 7.

Medial tube 30 can be welded, if desired, to one or more or each of vertical tubes 178. Tubes 178 are spaced apart horizontally from each other or in the length direction. A distance between adjacent tubes 178 is preferably sufficiently small such that the head of a crawling infant cannot be inserted between two adjacent tubes 178. A distance between adjacent tubes 178 is preferably sufficiently large such that the barrier 118 as a whole is relatively lightweight.

Guides 144 are generally U-shaped guides and, if desired, can include generally flat cradle portions to space partitions 140, 142 from each other. One of the upper guides is fixed to partition 140 and permits partition 142 to slide freely. The other of the upper guides is fixed to partition 142 and permits partition 140 to slide freely. One of the lower guides is fixed to partition 140 and permits partition 142 to slide freely. The other of the lower guides is fixed to partition 142 and permits partition 140 to slide freely.

In operation, barrier 118 can be removed from a shipping box or container. In this state, barrier 118 is in a fully closed configuration. In this fully closed configuration, slide nut 136 confronts spacer 80 and the proximal end of the threaded rod 116 because a large portion of the threaded rod 116 is contained in medial tube 130. In this fully closed configuration, the outer end member 150 of the first partition 140 confronts the inner end member 160 of the second partition 142. Also, in this fully closed configuration, outer end member 158 of second partition 142 confronts the inner end member 152 of the first partition 140. In this fully closed configuration, the end members are sequentially lined up or staggered as follows: outer end member 150 of the first partition 140, inner end member 160 of the second partition 142, inner end member 152 of the first partition 140, and outer end member 158 of the second partition 142. Such a fully closed configuration is found with barriers 10 and 200 as well.

Then, if desired, barrier 118 can be converted to a fully open position by hand sliding and thus quickly sliding the outer end member 158 of the second partition 142 away from the outer end member 150 of the first partition 140. In the fully open position, the inner edges of the upper guides 144 confront each other and the inner edges of the lower guides 144 confront each other such that the guides 144 act as stops to prevent the disengagement of the partitions 140, 142 from each other. To utilize the barrier 118 in the fully open position, the slide nut 136 is utilized to expand the barrier 118 from a configuration just short of the fully open position to the fully open position such that the barrier 118 is pressurized in the fully open position. In the fully open position, inner end member 160 of the second partition 142 confronts the inner end member 152 of the first partition 140. In this fully open configuration, the end members are sequentially lined up or staggered as follows: outer end member 150 of the first partition 140, inner end member 152 of the first partition 140, inner end member 160 of the second partition 142, and outer end member 158 of the second partition 142. This fully open configuration is found with barriers 10 and 200 as well.

The barrier 118 can be utilized in any of the in-between configurations, that is, any configuration between the fully closed configuration and the fully open configuration. In moving to an in-between position, the partitions 140 and 142 can be hand slid relative to each other. If the slide nut 136 stops such relative sliding, then the slide nut 136 is spun to be loosened and or pushed axially toward the proximal end of the threaded rod 116 to permit further contraction of the barrier 10. It should be noted that, unless engaged between two locations such as the door jambs 90, 92, the partitions 140, 142 can always be expanded relative to each other because for expansion the only stops are the guides 144 making contact with each other. It should be noted that the two partitions 140, 142 can always be contracted relative to each other if the slide nut 136 has been loosened, and the partitions 140, 142 can then be contracted up to where the slide nut 136 engages the spacer 80, because the slide nut 136 when loosened slides axially on the threaded rod 116. In other words, contraction of the barrier 118 when the slide nut 136 is loosened is no different from expansion such that partitions 140, 142 can always be contracted relative to each other because the only stop for contraction is the spacer 80 on the proximal end 86 of the threaded rod 74. An ultimate end position for the slide nut 136 is where the slide nut 136 confronts the spacer 80 and here, where the open end of the tube 130 confronts the slide nut 136, there is no further contraction between the first and second partitions 140, 142.

In the fully closed configuration, in the fully open configuration, and in the in-between positions, the partitions 140, 142 overlap or confront each other in the transverse or width direction.

When initially setting up barrier 118 between two locations such as the door jambs 90, 92, the partitions 140, 142 can be hand slid apart quickly over short or long distances until the bumpers 20 of the end members 150, 158 make contact with the door jambs 90, 92. Then the slide nut 136 of partition 140 is slid axially quickly over short or long distances along the threaded rod 116 of partition 140 until the slide nut 136 makes contact with the flat 128 of partition 142. Then the slide nut 136 is turned and tightened somewhat to bring pressure to bear on the flat 128, which in turn expands the barrier 118 incrementally. At such a point, the barrier 118 can be slid vertically up the door jambs 90, 92 to a desired height. Then the slide nut 136 can be tightened even more until the desired pressure is reached. It should be noted that the middle step here can be eliminated because the tightening of the slide nut 136 is a one hand operation. In other words, the partitions 140, 142 can be slid apart to an approximate distance of the distance between the door jambs 90, 92, then one hand can pick up the barrier 118 and place the barrier 118 at the desired height and, while this one hand is holding the barrier 118 at the desired height, the other hand can tighten the slide nut 136. To remove the barrier 118 from two locations such as from the door jambs 90, 92, the process is reversed, with the slide nut 136 being loosened slightly at first and then permitting the barrier 118 to rest on the floor 94, or with the slide nut 136 being loosened to a greater degree where one hand is holding the barrier 118 to prevent the barrier 118 from falling and where the other hand loosens the slide nut 136.

Barriers 10 and 118 can be referred to as adjustable gates. One unique feature of these gates is the quick acting nut or slide nut 113, 136 on the threaded rod 74 or 116 to achieve superior holding force for the gate in door jambs and between vertical surfaces. The quick acting nut is a one piece component that 1) will slide when held at an angle to quickly provide for large adjustments, and, subsequently, 2) will, via threads, automatically align and clamp quickly on the threaded rod to allow the user to make the gate very secure, and, lastly, 3) will fully disengage, when the gate must be moved, in about three, four or five revolutions so the panels or partitions can be quickly collapsed and removed from the opening. One of the keys for this design to work is the flat surface or disk 128 that is welded to the end of the horizontal tube 130 that the quick nut engages. This may be described as a method involving a threaded rod, a flat torque and a pressure accepting surface mated to the quick nut.

It should be noted that the quick nut present invention mechanism replaces numerous multiple component systems such as wooden gates which have a lever system and such as plastic gates which have a rack and pinion mechanism. Neither of these prior art gates can achieve optimum or maximum clamping force in an opening. These mechanisms are also more complex than the present invention, which includes simple mechanics and favorable physics.

As shown in FIG. 6A, an alternate embodiment of the present quickly slideable and incrementally adjustable barrier is indicated by reference numeral 200. The barrier 200 includes an alternate adjusting and pressurizing mechanism 202, a first partition 204, a second partition 206, guides 208A, 208B, 208C and 208D running to and between the first and second partitions 204, 206, and bumpers 210 on an outer end of each of the partitions 204, 206.

As shown in FIG. 6A, first partition 204 includes an upper member 212, a lower member 214, an outer end member 216, and an inner end member 218. Members 212, 214, 216 and 218 are preferably steel and tubular. Members 212, 214 run parallel to each other and preferably run horizontally when the barrier 200 is in use. Members 216, 218 run parallel to each other and preferably run vertically when the barrier 200 is in use. Members 212, 214 are preferably disposed at right angles to members 216, 218. The junctions of members 212, 216, 214 are curved. The junctions of members 212, 218, 214 are at right angles. End members 216, 218 run to and between upper and lower members 212, 214. Members 212, 214, 216, and 218 make up a peripheral frame 222 for partition 204. Interior support members 220 (eight in number) extend vertically to and between upper and lower members 212, 214. Two of the interior support members 220 are shown in FIG. 6A. Six of the interior support members 220 are hidden behind (or flush with) the interior support members of second partition 206. Members 212, 214, 216, 218 and 220 make up a frame for first partition 204.

As shown in FIG. 6A, second partition 206 includes an upper member 312, a lower member 314, an outer end member 316, and an inner end member 318. Members 312, 314, 316 and 318 are preferably steel and tubular. Members 312, 314 run parallel to each other and preferably run horizontally when the barrier 200 is in use. Members 316, 318 run parallel to each other and preferably run vertically when the barrier 200 is in use. Members 312, 314 are preferably disposed at right angles to members 316, 318. The junctions of members 312, 316, 314 are curved. The junctions of members 312, 318, 314 are at right angles. End members 316, 318 run to and between upper and lower members 312, 314. Members 312, 314, 316, and 318 make up a peripheral frame 322 for partition 206. Interior support members 320 (eight in number) extend vertically to and between upper and lower members 312, 314. All eight of the interior support members 320 are shown in FIG. 6A. Six of the interior support members 320 are shown to be flush with the interior support members 220 of first partition 204. Members 312, 314, 316, 318 and 320 make up a frame for second partition 206.

A direction between the outer and inner end members of the respective partitions 204, 206 is a length direction. A direction between the upper and lower members of the respective partitions 204, 206 is a height direction. A direction between the partitions 204, 206 themselves is a width direction and the partitions 204, 206 are spaced apart in the width direction. The upper and lower members of the partitions 204, 206 extend in the length direction. The outer and inner end members of the partitions 204, 206 extend in the height direction.

It should be noted that partitions 204 and 206 are structurally identical. Such is an advantage in manufacturing and assembly. Such also leads to a lower retail price for the consumer.

Each of the guides 208A, 208B, 208C and 208D is a U-shaped piece. Guides 208A, 208B, 208C, and 208D are identical in structure and function to guides 64, 66, 68, 70, and 144. Guide 208A is fixed, such as by welding, to upper member 212 and extends transversely to slidingly cradle upper member 312 therein. Guide 208B is fixed, such as by welding, to upper member 312 and extends transversely to slidingly cradle upper member 212 therein. Guide 208C is fixed, such as by welding, to lower member 214 and extends transversely to slidingly cradle lower member 314 therein. Guide 208D is fixed, such as by welding, to lower member 314 and extends transversely to slidingly cradle lower member 214 therein.

A pair of bumpers 210, identical in structure and function to bumpers 20, are fixed to outer end member 216 with a pin connector and a pair of bumpers 210 are fixed to outer end member 316 with a pin connector. Bumpers 210 are formed of a resilient material. Bumpers 210 on end member 216 are set at the same height as bumpers 210 on end member 316. The upper bumpers 210 are spaced from their respective upper members 212, 312. The lower bumpers 210 are spaced from their respective lower members 214, 314.

Interior support members 220 and 320, within their respective partitions 204, 206, are evenly spaced apart and the even spacing is continued to the respective end members 216, 218 and 316, 318. Such spacing is preferably sufficiently small such that the head of a crawling infant cannot be inserted into such spacing. Such spacing is preferably sufficiently large such that the barrier 200 as a whole relatively lightweight.

Interior support members 220 and 320 are preferably tubes. Members 212, 214, 216, 218, 312, 314, 316 and 318 are preferably tubes with a circular cross section. Upper member 212, 312, lower members 214, 314, outer end members 216, 316, and inner end members 218, 318, are portions that make up the peripheral frames 222, 322 of the respective partitions 204, 206 and are preferably square in section, with the exception of the rounded or curved junctures between 1) outer end member 216 and its upper and lower members 212, 214 and 2) outer end member 316 and its upper and lower members 312, 314.

It should be noted that each of members 212, 214 extends horizontally beyond the inner end member 218 and this portion that extends beyond inner end member 218 mounts the respective upper guide 208A and lower guide 208C. Likewise, each of members 312, 314 extends horizontally beyond the inner end member 318 and this portion that extends beyond inner end member 318 mounts the respective upper guide 208B and lower guide 208D.

Upper and lower members 212, 214 and outer end member 216 form generally the shape of a U. Upper and lower members 312, 314 and outer member 316 form generally the shape of a U such that each of peripheral frames 222, 322 is generally U-shaped. When partitions 204, 206 are combined, the U-shaped end members or outer end members 216, 316 are opposite of each other and these are the ends that confront door jambs 90, 92.

Partitions 204, 206 can be slid apart until guide or stop 208A makes contact with guide or stop 208B and/or until guide or stop 208C makes contact with guide or stop 208D. At this point, in sequence, running from one end of the barrier 200 to the other end of the barrier 200, there is the outer end member 316, then the inner end member 318, then the inner end member 218, and then the outer end member 216. In this position, the face of partition 204, as defined by the outer and inner members 216 and 218 and interior members 220, is wholly offset from the face of partition 206, as defined by the outer and inner members 316, 318 and interior members 320.

Partitions 204, 206 can be slid together until tube end 404 makes contact with the innermost portion of the adjusting and pressurizing mechanism 202, namely the washer 434 which then is forced into making contact with the distal end of the threaded wheel 430. In this position, when the slide 416 has been fully slid to the proximal end of tube 408 such that the slide 416 confronts spacer 412 and outer end member 216, the faces of the partitions 204, 206 substantially overlap. In this position, the faces of the partitions 204, 206 overlap except for a distance extending inwardly from outer end member 216 and except for a distance extending inwardly from outer end member 316. Each of such distances is about equal to the length of the slide 416.

Second partition 206 includes a horizontally extending tube 400. Tube 400 is fixed to and between outer end member 316 and inner end member 318. Tube 400 is spaced from interior support members 320 of partition 206. Tube 400 includes an end 402 that is a closed end by virtue of a plastic insert placed therein. Tube 400 includes an open end 404. Ends 402, 404 are fixed to outer end member 316 and inner end member 318 via feet 406 welded thereto that are in turn fixed to end members 316, 318 via pin connectors. Tube 400 is disposed parallel to upper and lower members 312, 314. Tube 400 is intermediate the upper and lower members 312, 314. Tube 400 is set slightly closer to upper member 312 than it is from lower member 314. Tube 400 is square in cross section.

First partition 204 includes a horizontally extending tube 408 that is received by horizontally extending tube 400. Tube 408 includes a proximal end 410 that is fixed by a pin connector to outer end member 216. This proximal end 410 is an open end that is closed off by a plastic insert set therein. A spacer 412 is set between tube end 410 and outer end member 216 such that tube 408 is coaxial with tube 400 and is easily slideable back and forth in tube 400 with minimal friction. The length of tube 408 equals the length of any of the upper members 212, 312 or lower members 214, 314 such that a distal end of tube 408 remains in tube 400 when the partitions 204, 206 have been fully slid apart, which occurs when guide or stop 208A meets guide or stop 208B and/or when guide or stop 208C meets guide or stop 208D. Tube 408 is disposed parallel to upper and lower members 212, 214. Tube 408 is intermediate the upper and lower members 212, 214. Tube 408 is set slightly closer to upper member 212 than it is from lower member 214. Tube 408 is square in cross section and includes a lesser height and width than does tube 400 such that tube 408 slides in tube 400. Tube 408 includes in its top section a plurality of holes 414 that can also be referred to as an index 414 or a set of predefined spaced apart locations 414. The holes extend from the proximal end 410 of tube 408 to a distal end region of the tube 408 and are set about one-half inches apart from each other such that the slide 416 is operable from the fully open configuration to the fully closed configuration of the barrier 200.

First partition 204 further includes a slide 416 that slides on the tube 408. Slide 416 includes a tubular sliding base 418. Sliding base 418 is integral and formed of a one-piece molded plastic. An interior of the sliding base 418 includes an opening square in section that extends the length of the sliding base 418 and that is coaxial with the tube 408 and tube 400. This opening in the sliding base 418 is sufficiently large such that base 418 slides readily on tube 408 and is sufficiently small such that base 418 does not rotate on tube 408. Base 418 includes a first cubed portion 420 that is in the form of a box or cube having six sides, with two of such sides being open to permit sliding on tube 498. First cubed portion 420 includes a vertically extending track 421. Vertically extending track 421 is formed on first and second opposing sides of the first cubed portion 420. A hole 425 is formed in the upper section of the first portion 420. Base 418 includes a second threaded portion 422 having exterior threads 424.

Slide 416 further includes a lift/drop button 426 that is formed in the shape of an inverted U. Button 426 is a plastic piece having a pair of sides and a top section extending between the pair of sides. A tab 427 extends inwardly from each of the inner side faces of each of the sides of the button 426 so as to engage and ride in tracks 421. The proximal end of a vertically extending pin connector 428 is engaged to the top section of the button 426 and the pin connector 428 extends downwardly therefrom. A distal end of the pin connector 428 engages one of the holes 414. When the distal end of the pin connector 428 is engaged in one of the holes 414, slide 416 is prevented from sliding on tube 408. Button 426 is pulled up or lifted up by the thumb and first finger. When button 426 is dropped and falls under the influence of gravity, button 426 rides in tracks 421 to maximize the chances that the distal end of the pin connector 428 makes contact with a middle portion of the top section of tube 498, so as to maximize the chances that the distal end of the pin connector 428 engages one of the holes 414. Button 426 can also be pushed down with a finger. Button 426 is biased in the downward direction under the influence of gravity. Pin connector 428 includes a head that is exposed to the user and that is visible to the user so as to provide an association between the pin connector 428 and the holes 414, both of which are visible to the user. A transitional wall 429 is formed between the first cubed portion 420 and the second threaded portion 422. This transitional wall 429, like tracks 421, is a guide for maximizing a straight lift up and a straight drop down of button 426, with minimum wobble, so as to maximize the chances of the distal end of the pin connector 428 engaging a hole 414. Pin connector 428 is rigidly fixed in button 426.

Slide 416 further includes an elongate wheel 430. A portion of the inner surface of the elongate wheel 430 is threaded and engages the threads 424 of second threaded portion 422. Another portion of the inner surface of elongate wheel 430, instead of being threaded, is a flat annular or cylindrical inner surface. Providing threads on only a portion of the inner surface of elongate wheel 430 provides for lesser friction and an easier spinning of wheel 430. Providing a greater length to, or maximizing the length of, the elongate wheel 430 maximizes a gripping surface with which the user may interact. To further aid in spinning or turning the wheel 430, elongate horizontally extending ridges 432 are formed integrally and one-piece with the wheel 430. When wheel 430 is turned, wheel 430 incrementally travels to or from the first cubed portion 420 and to or from the tube open end 404 of tube 400.

Slide 416 further includes a washer 434 for being disposed between the wheel 430 and the tube end 404. Washer 434 includes an opening square in section so as to ride on and slide on tube 408 without rotating on tube 408. Washer 434 includes a relatively small annular portion 436 having an outside diameter slightly smaller than the inner diameter of the distal end of the wheel 430. Washer 434 includes a relatively large annular portion 438 that includes a proximal face for confronting the relatively large distal end of wheel 430 and a distal face for confronting the relatively small tube open end 404 of tube 400. Washer 434 minimizes an overtightening of wheel 430 and maximizes a loosening of wheel 430 when the wheel 430 has been tightened to a high degree.

Figure 7C:
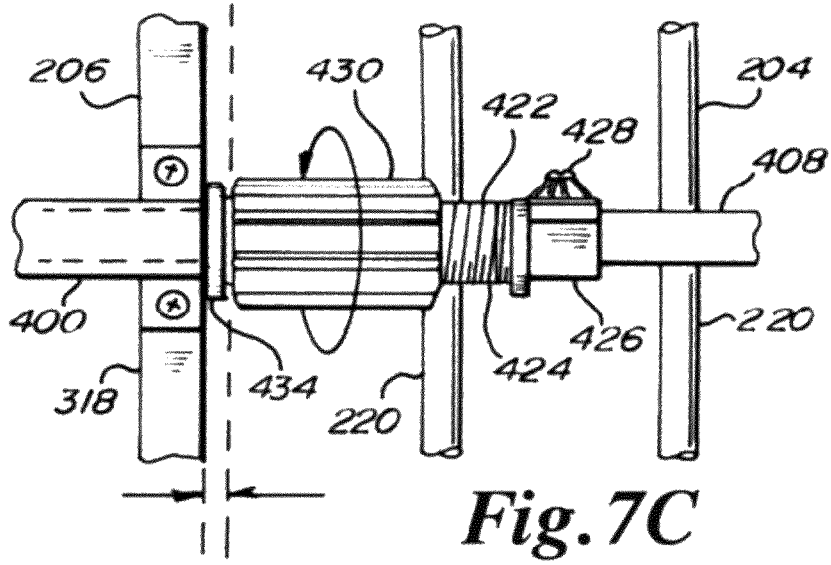
FIG. 7C is a side, detail view of the incrementally adjustable slide of FIG. 7B in the second predefined position and in the process of being tightened so as to expand the barrier portions to an incrementally expanded position.
Figure 8A:
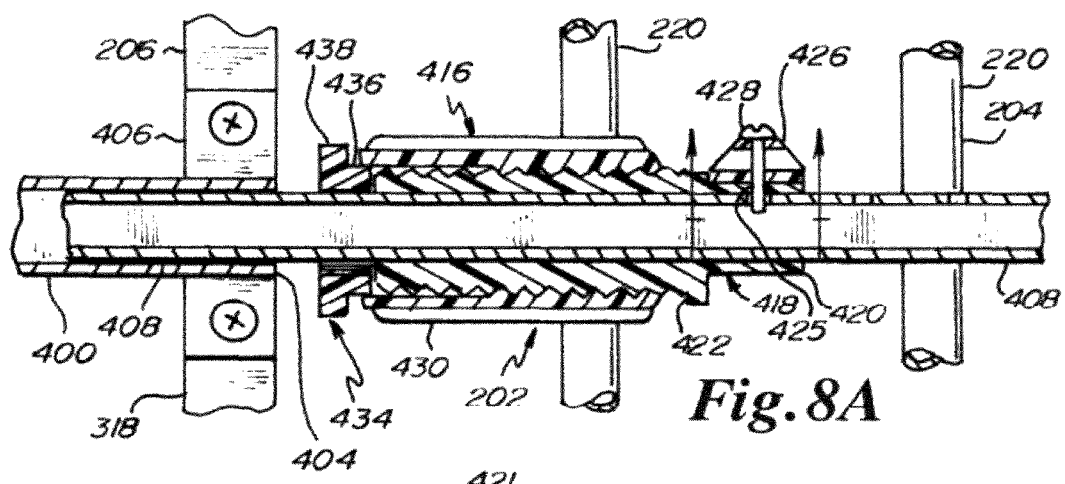
FIG. 8A is a detail, sectional view of the incrementally adjustable slide of FIG. 6B.
Figure 8B:
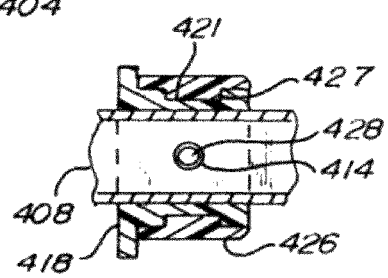
FIG. 8B is a detail view along lines 8B-8B of FIG. 8A showing how the incrementally adjustable slide engages the predefined positions.
Figure 8C:
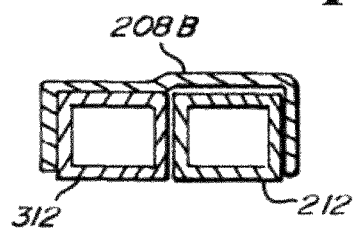
FIG. 8C is a detail, section view showing how barrier portions or partitions engage each other.
Figure 8D:
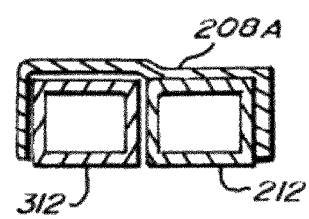
FIG. 8D is a detail, section view showing how barrier portions or partitions engage each other.

It should be noted that FIG. 7C shows the threaded wheel 430 with a short distance to travel until it engages the proximal face of relatively large annular portion 438 of washer 434, whereupon the distal face of relatively large annular portion 438 of washer 434 will bring pressure to bear upon tube end 404 of tube 400, whereupon relatively small annular portion 436 is fully received within the threaded wheel 430.

In operation, the barrier 200 is placed in the passageway that the user is attempting to close, such as between door jambs 90, 92. Then, with a hand on each side of the barrier 200, such as a hand on each of the upper members 212, 312 of the partitions 204, 206, the user pulls the partitions 204, 206 away from each other such that the partitions 204, 206 slide away from each other. The user is not instructed to place his or her hands on the interior support members 220, 320 since the interior support members 220 of the first partition 204 will cross or slide by the interior support members 320 of the second partition 206 in opposite directions such that the user may pinch his or her fingers. Once the bumpers 20 are touching the door jambs 90, 92, the lift up/drop down button 426 is lifted to disengage the distal end of the pin connector 428 from one of the holes 414. Then the slide 416 is slid in the direction of the second partition 206 until the distal end of the wheel 430 engages the washer 434 and the washer 434 engages the open end 404 of the tube 400 of the second partition 206. Then the user drops the button 426 or uses slight pressure to push the button 426 downwardly, whereupon the distal end of pin connector 428 may engage one of the holes 414. Then, if the pin connector 428 does not engage one of the holes 414, the user slides the slide 416 away from the open end 404 of tube 400, with the distal end of the pin connector 428 riding on the upper surface of tube 408, until the distal end of the pin connector 428 drops into the first hole 414 that it confronts. At this point in time the slide 416 is fixed on the tube 408 and is thereby fixed on the first partition 204. Then the wheel 430 is turned such that the wheel 430 travels away from the first cubed portion 420 and away from the pin connector 428 and towards the open end 404 of the tube 400 of the second partition, whereupon the distal end of the wheel 430 brings pressure to bear upon the washer 434, which in turn brings pressure to bear upon the open end 404 of tube 400, such that first partition 204 is bringing pressure to bear upon second partition 206 in an expanding fashion, such that barrier 200 becomes rigidly fixed between the door jambs 90, 92. To release the barrier 200 from the door jambs 90, 92, the wheel 430 is turned in the opposite direction, and this release is sufficient to remove the barrier 200 from the door jambs 90, 92.

It should be noted that holes 414 are spaced apart in the length direction and that wheel 430 travels in the length direction to a maximum distance of between three and four holes 414. In use, wheel 430 may travel over a length equal to less than the distance between two holes, whereupon partitions 204, 206 expand sufficiently to a holding position between door jambs 90, 92. A range of travel for the wheel 430 may therefore be described as being between about one millimeter and about two inches or as being between about one millimeter and about four predefined locations or holes 414.

It should be noted that with slide 416, the user enjoys the benefit of 1) a barrier 200 that may expand to fit a relatively large opening or a relatively small opening, 2) a fast set up because the slide 416 slides quickly along the elongate tube 408 until the pin connector 428 is located in one of the predefined holes 414, and 3) an incremental and custom fit to a unique passageway by virtue of the threaded wheel 430 that tightens the partitions 204, 206 after the pin connector 428 has been engaged.

It should be noted that the adjusting and pressurizing mechanism 202 includes the tube 400, the tube 402, the slide 416, the sliding base 418, the first and second portions 420, 422 of the sliding base 418, the threaded wheel 430, and the washer 434.

It should be noted that first partition 204 can be defined so as to include the tube 408, the slide 416, the sliding base 418, the first and second portions 420, 422 of the sliding base 418, the threaded wheel 430, and the washer 434. The second partition 206 can be defined so as to include the tube 400.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

We claim:

1. A sliding expanding incrementally adjustable barrier for placement between two opposing locations, comprising:
   a) a first slidable partition comprising a first frame, with the first slidable partition extending in the length and height directions;
   b) a second slidable partition comprising a second frame, with the second slidable partition extending in the length and height directions;
   c) wherein a direction between the first and second partitions is a width direction, wherein said first and second partitions are engaged to and spaced apart from each other in said width direction, wherein said frames of said first and second partitions lie parallel to each other and slide parallel to each other;
   d) an elongate member engaged to the first partition and engaged between the first and second partitions and being disposed in said length direction, with said elongate member having predefined spaced apart locations; and
   e) a slidable piece on said elongate member and being slidable on said elongate member in said length direction, with said slidable piece having a first portion and a second portion, with said first portion being engagable to said elongate member at said predefined spaced apart locations, with said second portion having a threaded member turnable thereon, with said threaded member having an end confronting the second partition and being turnable to confront the second partition, with said threaded member being turnable to and from said first portion in the length direction and thus being turnable to and from said second partition in the length direction, such that when said threaded member is turned on said second portion to confront the second partition and when said first portion is engaged at one of said predefined locations on the first partition, said threaded member brings pressure to bear upon said second partition and draws the first and second partitions slidingly in opposite directions along said length direction such that ends of the first and second partitions are incrementally drawn apart to incrementally place pressure upon said opposing locations.

2. A sliding expanding incrementally adjustable barrier for placement between two opposing locations, comprising:
   a) a first partition comprising a frame comprising an upper member, a lower member, an outer end member and an inner end member, wherein a direction between the outer and inner end members of said first partition is a length direction, wherein a direction between said upper and lower members of said first partition is a height direction, wherein said frame of said first partition is in a first plane and wherein said frame of said first partition is slidable in said first plane, and wherein said upper and lower members of said first partition extend in said length direction;
   b) a second partition comprising a frame comprising an upper member, a lower member, an outer end member and an inner end member, wherein a direction between the outer and inner end members of said second partition is said length direction, wherein a direction between said upper and lower members of said second partition is a height direction, wherein said frame of said second partition is in a second plane and wherein said frame of said second partition is slidable in said second plane, and wherein said upper and lower members of said second partition extend in said length direction;
   c) wherein a direction between the first and second partitions is a width direction, wherein said first and second partitions are engaged to and spaced apart from each other in said width direction, wherein said frames of said first and second partitions and first and second planes are parallel to each other, and wherein said frames of said first and second partitions slide parallel to each other in said first and second planes;
   d) an elongate member engaged to the first partition and being disposed in said length direction, with said elongate member having predefined spaced apart locations;
   e) a tube engaged to the second partition and being disposed in said length direction, wherein the tube includes an end, and wherein the tube receives at least a portion of said elongate member; and
   f) a slidable piece on said elongate member and being slidable on said elongate member in said length direction, with said slidable piece having a first portion and a second portion, with said first portion being engagable to said elongate member at one of said predefined spaced apart locations, with said second portion having a threaded member turnable thereon and confronting said end of said tube, with said threaded member being turnable to confront said end of said tube, with said threaded member being turnable to and from said first portion in the length direction and thus being turnable to and from said end of said tube in the length direction, such that when said threaded member is turned on said second portion to confront said end of said tube on the second partition and when said first portion is fixed at one said predefined spaced apart locations on said elongate member engaged to the first partition, said threaded member brings pressure to bear upon said end of said tube and draws the first and second partitions slidingly in opposite directions along said length direction such that ends of the first and second partitions are incrementally drawn apart to incrementally place pressure upon said opposing locations.

* * * * *